United States Patent
Mohapatra et al.

(10) Patent No.: US 11,335,091 B1
(45) Date of Patent: May 17, 2022

(54) ENABLING A DEVICE WITH CAMERA AND DISPLAY TO CONTROL OTHER DEVICES (UNIVERSAL REMOTE CONTROL APP)

(71) Applicant: Sony Group Corporation, Tokyo (JP)

(72) Inventors: Bibhudendu Mohapatra, Escondido, CA (US); David Young, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/131,528

(22) Filed: Dec. 22, 2020

(51) Int. Cl.
*G06F 3/048* (2013.01)
*G06V 20/20* (2022.01)
*G06F 3/0484* (2022.01)

(52) U.S. Cl.
CPC .......... *G06V 20/20* (2022.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 8,429,103 | B1 * | 4/2013 | Aradhye | G06N 20/00 706/12 |
| 8,896,426 | B1 * | 11/2014 | Mui | G08C 19/00 340/12.23 |
| 2002/0073416 | A1 * | 6/2002 | Ramsey Catan | H04N 21/4415 725/6 |
| 2007/0052548 | A1 * | 3/2007 | Hankin | G08C 17/02 340/12.22 |
| 2009/0224955 | A1 * | 9/2009 | Bates | G08C 19/28 341/175 |
| 2013/0129142 | A1 * | 5/2013 | Miranda-Steiner | G06K 9/00664 382/103 |
| 2014/0229889 | A1 * | 8/2014 | Hilbrink | G06F 3/04886 715/784 |
| 2014/0327782 | A1 * | 11/2014 | Mangla | H04N 21/44008 348/161 |
| 2017/0364733 | A1 * | 12/2017 | Estrada | G06N 3/0454 |
| 2019/0346914 | A1 | 11/2019 | Fukuchi | |

FOREIGN PATENT DOCUMENTS

KR 20190109337 A 9/2019

* cited by examiner

*Primary Examiner* — William C Trapanese
(74) *Attorney, Agent, or Firm* — Trellis IP Law Group, PC

(57) ABSTRACT

A method of providing a remote-control interface on a smart device for an electronic device by operating an app, developed using machine learning (ML) comprising supervised learning, on the smart device to: use a camera in the smart device to capture an image of the electronic device, with minimal requirements on image quality; operate on the captured image to identify the electronic device in terms of make and model; select from a database of remote-control user interfaces a remote-control user interface corresponding to the identified make and model of the electronic device; and present the selected remote-control user interface on the smart device to a user.

In some cases, the captured image is tagged with at least one of date, time, and global location information, allowing further identification in terms of at least one of version ID and region of sale.

18 Claims, 3 Drawing Sheets

ENABLING A DEVICE WITH CAMERA AND DISPLAY TO CONTROL OTHER DEVICES (UNIVERSAL REMOTE CONTROL APP)

BACKGROUND

Many households currently use a myriad of electronic devices, each with its own unique hardware-implemented remote-control, even if a single manufacturer produced more than one of the devices. Keeping track of even one, let alone several remotes, can be a nuisance, and searching for the correct one out of many, when wanting to operate the one corresponding electronic device, can be time consuming and frustrating.

Some current approaches to addressing this issue use an app running on a smart device, such as a smart phone, to present a remote-control interface to the user, typically on the display of that smart device. This replaces the need to find and operate the hardware controller with finding and operating their smart device, and as people generally already keep close track of their own smart phones or devices for other reasons, the burden on the user is reduced.

However, identifying the electronic device with sufficient precision to be able to present the correct corresponding remote-control interface is a real problem, and the need to depend on the user to manually input the necessary electronic device identifying information runs counter to the goal of simplifying the user experience. While it is possible to design electronic devices capable of automatically communicating wirelessly with smart devices to transmit their own identifying information, the vast number of remotely controllable electronic devices in current widespread use do not have this capability, and it seems unlikely to be adopted and implemented by a majority of manufacturers of all future electronic devices.

There remains a need, therefore, to provide a method that can identify electronic devices with the necessary precision, while making minimal demands on the user, and present the correct corresponding remote-control interface to the user. Ideally the method would make use of an app running on a smart device already in the user's possession and proximity, would not need additional hardware or complex processing power in either the electronic device of interest or the smart device, would work well over a wide range of electronic devices likely to be encountered, and might offer options for user-customization.

SUMMARY

Embodiments generally relate to methods and systems to provide a remote-control interface on a smart device for an electronic device by operating an app on the smart device.

In one embodiment, a method is disclosed that uses the app, developed using machine learning (ML) comprising supervised learning, to: use a camera in the smart device to capture an image of the electronic device, with minimal requirements placed on ambient lighting, on relative positioning of the electronic device and smart device, and on user expertise; operate on the captured image to identify the electronic device in terms of make and model; select from a database of remote-control user interfaces a remote-control user interface corresponding to the identified electronic device; and display the selected remote-control user interface on the smart device to a user.

In another embodiment, where a plurality of electronic devices is present, a method is disclosed that uses the app, developed using machine learning (ML) comprising supervised learning, to: use a camera in the smart device to capture an image of the plurality of electronic devices, with minimal requirements placed on ambient lighting, on relative positioning of the electronic device and smart device, and on user expertise; select one of the plurality of electronic devices in the captured image as a chosen one to be identified; operate on the captured image to identify the chosen one of the plurality of electronic devices in terms of make and model; select from a database of remote-control user interfaces a remote-control user interface corresponding to the identified electronic device; and display the selected remote-control user interface on the smart device to a user.

In yet another embodiment, an apparatus is disclosed, comprising a smart device comprising a camera, a display, and one or more processors; and software encoded in one or more computer-readable media for execution by the one or more processors. When executed, the software is operable to: work in collaboration with the smart device to: use the camera to capture an image of an electronic device, with minimal requirements placed on ambient lighting, on relative positioning of the electronic device and smart device, and on user expertise; operate on the captured image to reliably and accurately identify the electronic device in terms of make and model; select from a database of remote-control user interfaces a remote-control user interface corresponding to the identified electronic device; and present the selected remote-control user interface on the display of the smart device to a user. The software comprises an app developed using machine learning (ML) comprising supervised learning.

A further understanding of the nature and the advantages of particular embodiments disclosed herein may be realized by reference of the remaining portions of the specification and the attached drawings.

DETAILED DESCRIPTION OF EMBODIMENTS

Embodiments described herein are directed to the use of an app on a smart device to facilitate control of an electronic device—a TV, or a sound bar, for example, in the vicinity of a potential user—using image recognition on an image captured by the smart device to unambiguously identify the electronic device and present a corresponding remote-control user interface to that user.

The present invention is implemented by an app, developed using Machine Learning (ML), comprising supervised learning techniques, to carry out the identification.

Figure 1:
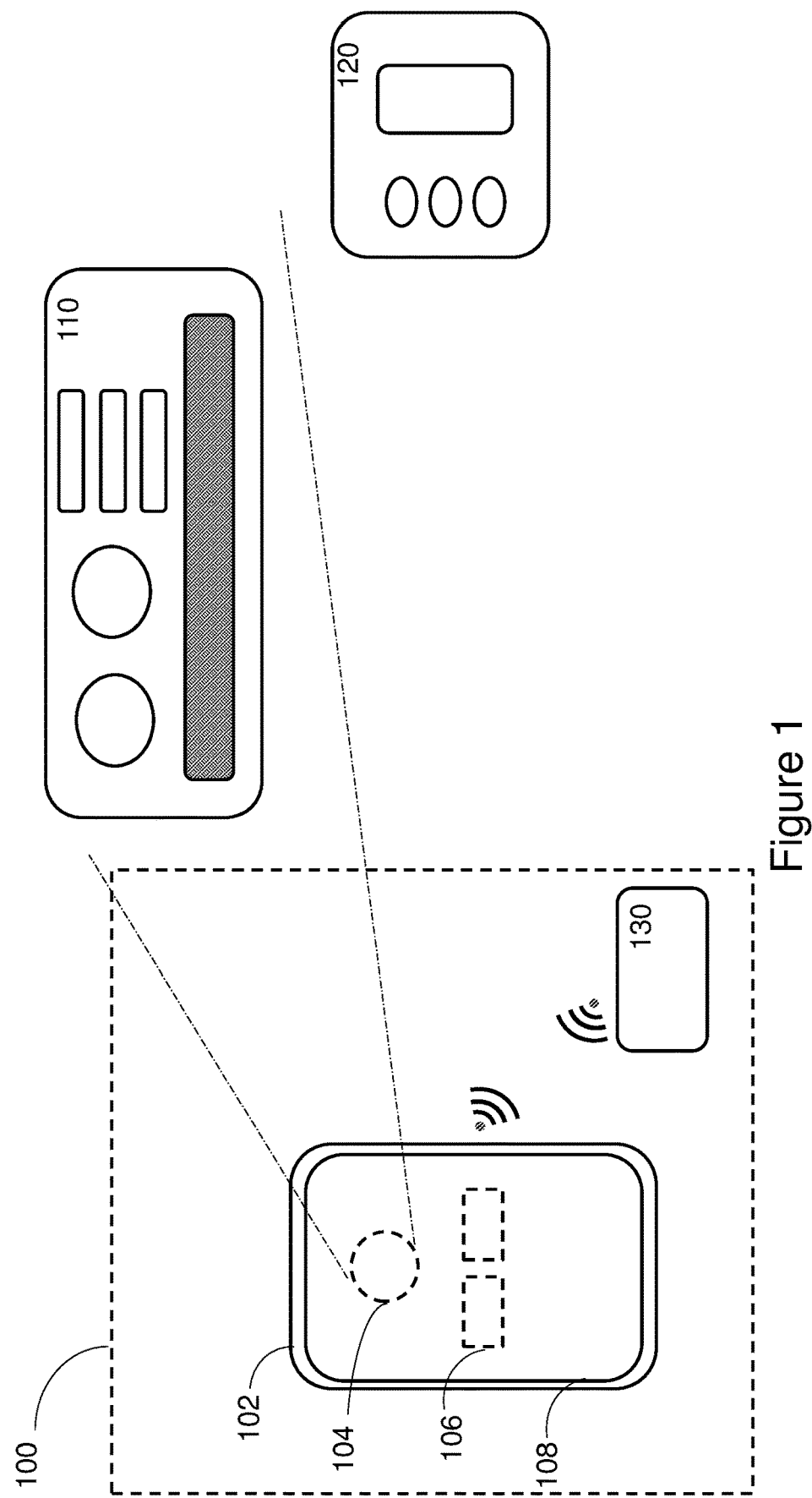
FIG. 1 illustrates a system for providing a remote-control interface on a smart device for an electronic device according to one embodiment.
Figure 2:
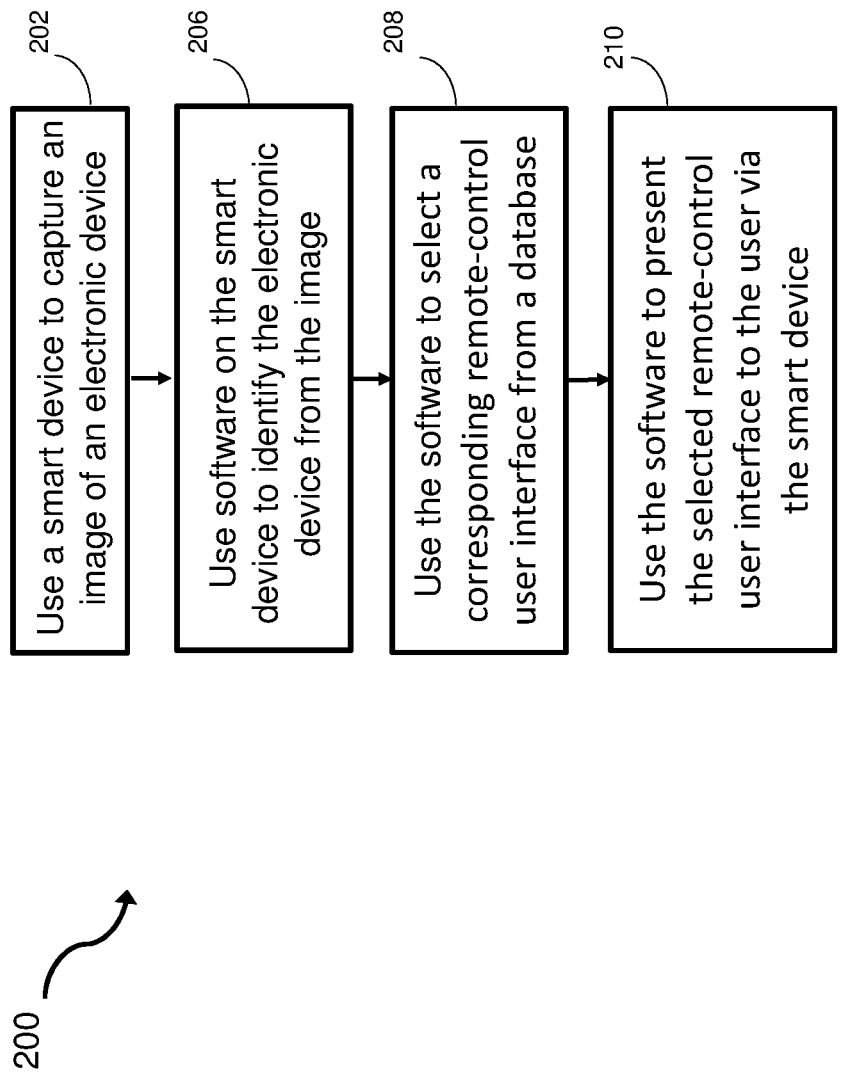
FIG. 2 is a flowchart of a method for providing a remote-control interface on a smart device for an electronic device according to one embodiment.

FIG. 1 schematically illustrates a system embodiment 100 comprising a smart device 102 communicatively coupled to a database 130, In this case device 102 is shown as a smart phone (though it could be a tablet, laptop, or other computing device in the user's possession) that includes a camera 104 and one or more processors 106 running a specialized software app. A plurality of remote-control user interfaces, from which a desired interface may be selected as will be described below with regard to FIG. 2, is stored in database 130. The figure shows smart device 102 face on, for convenience. but in use, the device will be positioned and oriented as necessary for the electronic device of interest, 110, to be present in the field of view (indicated in this view by dashed lines) of camera 104.

The manner in which system 100 operates to carry out the present invention may best be understood with reference to the flowchart of method 200, shown in FIG. 2, where it is assumed that a special "remote-control interface" app, previously installed on a smart device (such as device 102), has been started. At step 202, the app operates in conjunction with the camera of the smart device allowing the user to capture an image including an electronic device of interest (such as device 110). In some cases, the captured image will show the entire front face of the electronic device, as seen, for example, in the view of FIG. 1, showing various knobs and indicators, a display panel etc. In some other cases, an angled view may be obtained, showing part of a side face or the top face or other easily visible surface, as well as part or all of the front. A key advantage of the present invention, as will be discussed further below, is that no special expertise or effort is demanded of the user, who is typically very familiar with the process of taking simple camera shots with their own smart device.

At step 206, the app carries out an image processing operation on the captured image to identify the electronic device. The processing may happen entirely within the smart device, or be split between local and remote operations, for example using cloud processing.

In many cases, determining the make and model of the electronic device is sufficient for an unambiguous identification. In other cases, described further below, other features may also be relevant to full identification.

To carry out the image processing operation in step 206, the present invention makes use of a machine learning approach, involving supervised learning, by which the app has been "trained" to be able to make correct identifications even with images of sub-optimal quality. Tolerance can be made high for poor lighting, for example, or slight defocusing. The training process, which occurs before the app is ready for installation or download to the smart device (although updates may be made, and downloaded as necessary) involves presenting the app with multiple images of each of the variety of electronic devices the app can reasonably be assumed to be faced with in use, each image having been labeled or tagged with the correct make and model number by a knowledgeable human supervisor. A degree of expertise is required of that person, as devices of the same type, such as sound bars, for example, supplied by different manufacturers, may have very similar exterior appearances, and be difficult for the casual viewer to distinguish between. Also, manufacturers often update device models over time, where the updates may include internal hardware and firmware changes, which may not be distinguishable from an image of the exterior of the device but may require slightly different remote-control command interfaces.

The app is designed to learn from the exposure to several such labeled images of each device, at different angles, magnifications, illumination conditions, and ideally at different resolution levels, and even sharpness of focus, such that it can subsequently recognize that make and model of electronic device from other, previously unseen images, without any input from the supervisor or user. In some cases, a convolutional neural network may be used to improve image quality to the point where a reliable, accurate identification can be made.

There are instances where a manufacturer may make different versions of a given model (adapted to different geographical regions, for example) or, as mentioned above, update a model over time, without necessarily changing the model number. In such cases a full identification might go beyond make and model to include one or more details like a version number, a region of sale, even date range, in order to correctly match the device to an appropriate remote-control user interface.

Of course, the whole universe of electronic devices cannot be accommodated, but for a large range of models from each of a reasonable number of major manufacturers, it should be possible to provide a suitable training set of images for the supervised learning process. Images may readily be obtained from the public domain, such as from advertising material or review articles, available on the internet or in hardcopy.

Returning to the operation of method 200, at step 208, after the app has identified the electronic device, the app proceeds, again without user input being necessary, to select the remote-control user interface, most closely corresponding to the identified device, from a database of remote-control user interfaces. Creation and maintenance of the database would almost certainly require collaboration with electronic device manufacturers, to make the correct remote-control user interfaces available. The database would not have to be in the vicinity of the user, and could even be in the cloud.

At step 210, the app presents the selected remote-control user interface to the user on the display of the smart device. Typically, the interface is a graphical user interface, which is shown on a display screen of the smart device (such as display area 108 of device 102 in FIG. 1). In some embodiments, the selected, displayed interface may enable the user to interact with the electronic device by gestures and/or audio control, rather than solely through the display screen, by tapping or pressing icons visible. In all cases, the end result of method 200 is that the user is enabled to use the remote-control interface presented via smart device 102 to control electronic device 110.

In some embodiments, the image may be "tagged" automatically as it is captured, with date, time, and/or global location information. The additional data may allow the app to recognize not only make and model but also the version ID (if applicable) as well as the location of the user, roughly corresponding to the location of the electronic device. Following this more precise identification, the app may be able to select between a set of remote-control user interfaces in the database that all apply to devices of the identified make and model but differ in some details according to the version ID (which may have changed at a particular date), and/or location, and choose the most appropriate one.

In some cases, the location tagging would allow the selected remote-control interface to be presented to the user in the language most appropriate to the global location. In other cases, it would allow the option of changing the language to be presented, when the user has moved away from the country of purchase, for example.

In some embodiments, the method of the present invention may include carrying out an authentication process to make sure that the user of the smart device is authorized to control the identified electronic device, before the selected remote-control user interface is made operational.

The remote-control user interface is typically a graphical user interface, though other types may be used in some applications.

In some embodiments involving a graphical user interface, one or more parameters of the graphical user interface may be configurable by the user, according to the user's own preference.

In some embodiments, the app may make use of a type of machine learning known as preference learning, allowing the app to automatically adjust how one or more elements in the selected remote-control user interface are presented, based on the user's prior patterns of interaction or usage. In this way, the user's history of interaction with to selected remote-control user interface informs how the interface is subsequently presented, such as which controls are more prominently featured, or more easily accessed, for example.

In some instances, there may be more than one electronic device in the vicinity of the user, that could be included deliberately or inadvertently in the image captured by the user. Consider the FIG. 1 example, where minor changes of position (tilt for example, and/or distance from devices 110 and 120) of smart device 102 could cause the field of view of its camera 104 to include part or all of both electronic devices 110 and 120, so that the captured image would also show both.

Figure 3:
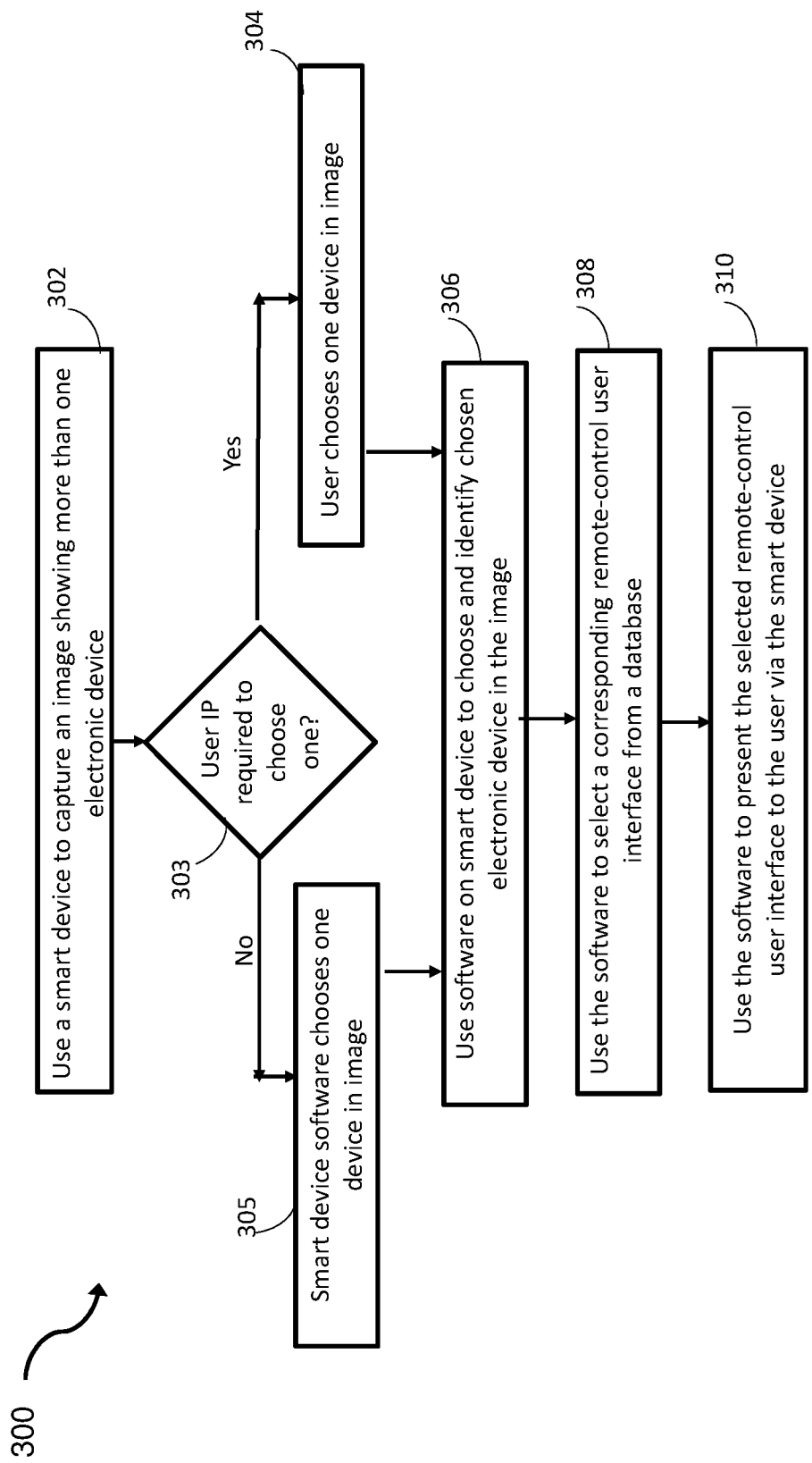
FIG. 3 is a flowchart of a method for providing a remote-control interface on a smart device for an electronic device according to some other embodiments.

FIG. 3 is a flowchart illustrating a method 300 of carrying out the present invention in some multi-device situations. At step 302, analogous to step 202 in method 200, the user uses the smart device to capture an image, but in this case the image shows more than one electronic device. At step 304, a decision is made on whether user input in needed to select one of those devices rather than the other(s) as the one the user is immediately interested in operating, in which case the part of the captured image containing the other device may be ignored in the image processing identification process, and the retrieval and presentation of the correct remote control interface in later steps of the method. The flowchart shows two extreme case. In one case, where it is decided that user input is needed, step 304 is carried out, to request and accept that input and settle the choice. In the other case shown, the app automatically selects one of the electronic devices pictured as the one likely to be of interest, at step 305. The decision may be made on the basis of frequency of use, for example, or on which device was most recently used, but various other criteria may be involved. In either case, process flow then continues with steps 306, 308, and 310, analogous to steps 206, 208, and 210 of method 200, in which the chosen device is identified, the corresponding user interface retrieved from a database, and presented to the user through the smart device.

There may be a hybrid embodiment, not shown in the figure for simplicity, for multi-device situations, where the app offers the user an option to override the choice made by the app at step 305.

Embodiments described herein provide various benefits to users of remotely controllable electronic devices, especially in situations where many electronic devices, each with their own hardware remote, are present. In particular, embodiments provide convenient means to remotely control an electronic device of interest without requiring the user to locate the particular hardware controller specific to that device. Instead, the user just makes use of an app on a smart device that is already in their possession, carries out a simple "point and shoot" to capture an image of that device, and is speedily presented with an appropriate remote-control interface. The identification of the electronic device, and therefore the optimum interface, is made reliably and with high accuracy, because of the supervised learning process conducted during development of the app.

Some embodiments also facilitate customization of the interface for the individual user, which provides a significant improvement over what is possible with hardware remotes.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method of providing a remote-control interface on a smart device for an electronic device by operating an app on the smart device, the method comprising:
   using the app, developed using machine learning (ML) comprising supervised learning, to:
      use a camera in the smart device to capture an image of the electronic device, without placing requirements on ambient lighting, on relative positioning of the electronic device and smart device, or on user expertise;
      operate on the captured image to identify the electronic device in terms of make and model;
      select from a database of remote-control user interfaces a remote-control user interface corresponding to the identified electronic device; and
      display the selected remote-control user interface on the smart device to a user; and
   wherein the captured image is tagged automatically, as it is captured, with at least one of date, time, and global location information, directly corresponding to image capture conditions, allowing the app to further identify the electronic device in terms of at least one of version ID and region of sale.

2. The method of claim 1, wherein the selection of the remote-control interface from the database is in part determined by at least one of the version ID and global location of the user, as inferred from the tagged information associated with the captured image.

3. The method of claim 1, wherein the selected remote-control user interface is presented to the user in a language appropriate to the region of sale, as inferred from the tagged information associated with the captured image.

4. The method of claim 1 further comprising
   an authentication process to ensure the user of the smart device is authorized to control the identified electronic device, before the selected remote-control user interface is made operational.

5. The method of claim 1, wherein the selected remote-control user interface is a graphical user interface.

6. The method of claim 5, wherein one or more parameters of the graphical user interface are configurable by the user.

7. The method of claim 1, wherein the selected remote-control user interface automatically adjusts presentation of one or more elements in the selected remote-control user interface, based on a prior pattern of interaction between the user and the selected remote-control user interface.

8. The method of claim 1, wherein the selected remote-control user interface enables audio control of the electronic device.

9. A method of providing a remote-control interface on a smart device for one of a plurality of electronic devices by operating an app on the smart device, the method comprising:
   using the app, developed using machine learning (ML) comprising supervised learning, to:
      use a camera in the smart device to capture an image of the plurality of electronic devices, without placing requirements on ambient lighting, on relative positioning of the electronic device and smart device, or on user expertise;
      select one of the plurality of electronic devices in the captured image as a chosen one to be identified;
      operate on the captured image to identify the chosen one of the plurality of electronic devices in terms of make and model;
      select from a database of remote-control user interfaces a remote-control user interface corresponding to the identified electronic device; and
      display the selected remote-control user interface on the smart device to a user; and
   wherein the captured image is tagged automatically, as it is captured, with at least one of date, time, and global location information, directly corresponding to image capture conditions, allowing the app to further identify the chosen electronic device in terms of at least one of version ID and region of sale.

10. The method of claim 9,
    wherein selecting one device of the plurality of electronic devices in the captured image comprises the user choosing one device of the plurality of electronic devices as a chosen one.

11. The method of claim 9,
    wherein selecting one device of the plurality of electronic devices in the captured image comprises the app automatically selecting one device of the plurality of electronic devices as a chosen one.

12. An apparatus comprising:
    a smart device comprising a camera, a display, and one or more processors; and
    software encoded in one or more computer-readable media for execution by the one or more processors and when executed operable to:
    operate in collaboration with the smart device to:
    use the camera to capture an image of an electronic device, without placing requirements on ambient lighting, on relative positioning of the electronic device and smart device, or on user expertise;
    operate on the captured image to identify the electronic device in terms of make and model;
    select from a database of remote-control user interfaces a remote-control user interface corresponding to the identified electronic device; and
    present the selected remote-control user interface on the display of the smart device to a user;
    wherein the software comprises an app developed using machine learning (ML) comprising supervised learning; and
    wherein the captured image is tagged automatically, as it is captured, with at least one of date, time, and global location information, directly corresponding to image capture conditions, allowing the app to further identify the electronic device in terms of at least one of version ID and region of sale.

13. The apparatus of claim 12, wherein the selection of the remote-control interface from the database is in part determined by at least one of version ID and region of sale, as inferred from the tagged information associated with the captured image.

14. The apparatus of claim 12, wherein the selected remote-control user interface is presented to the user in a language appropriate to the region of sale, as inferred from the tagged information associated with the captured image.

15. The apparatus of claim 12, wherein the software when executed is further operable to:
   conduct an authentication process to ensure the user of the smart device is authorized to control the identified electronic device, prior to presenting the selected remote-control user interface to the user.

16. The apparatus of claim 12, wherein the selected remote-control user interface is a graphical user interface.

17. The apparatus of claim 16, wherein one or more parameters of the graphical user interface are configurable by the user.

18. The apparatus of claim 12, wherein the selected remote-control user interface automatically adjusts presentation of one or more elements in the selected remote-control user interface, based on a prior pattern of interaction between the user and the selected remote-control user interface.

* * * * *